United States Patent
Shukla et al.

(10) Patent No.: US 9,232,389 B2
(45) Date of Patent: Jan. 5, 2016

(54) MIXED MODE SECURITY FOR MESH NETWORKS

(75) Inventors: Ashish Kumar Shukla, Pune (IN); Sandesh Goel, Pune (IN); Rajesh Shreeram Bhagwat, San Jose, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 795 days.

(21) Appl. No.: 12/482,817

(22) Filed: Jun. 11, 2009

(65) Prior Publication Data

US 2009/0313464 A1    Dec. 17, 2009

Related U.S. Application Data

(60) Provisional application No. 61/060,583, filed on Jun. 11, 2008.

(51) Int. Cl.
 *H04L 29/06*    (2006.01)
 *H04W 12/02*    (2009.01)
 *H04W 84/18*    (2009.01)

(52) U.S. Cl.
 CPC .............. *H04W 12/02* (2013.01); *H04W 84/18* (2013.01)

(58) Field of Classification Search
 CPC ................................ H04W 12/02; H04W 84/18
 USPC .......................................................... 713/151
 See application file for complete search history.

(56) References Cited

U.S. PATENT DOCUMENTS

| | | | |
|---|---|---|---|
| 2003/0169335 A1* | 9/2003 | Monroe | 348/143 |
| 2003/0212827 A1* | 11/2003 | Saha et al. | 709/247 |
| 2003/0233538 A1* | 12/2003 | Dutertre | 713/151 |
| 2005/0144437 A1* | 6/2005 | Ransom et al. | 713/151 |
| 2006/0077955 A1* | 4/2006 | Poustchi et al. | 370/352 |
| 2006/0153081 A1* | 7/2006 | Simonsson et al. | 370/238 |
| 2006/0268802 A1* | 11/2006 | Faccin | 370/338 |
| 2007/0248104 A1* | 10/2007 | Rudolf et al. | 370/400 |
| 2007/0258508 A1* | 11/2007 | Werb et al. | 375/140 |
| 2007/0263984 A1* | 11/2007 | Sterner et al. | 386/95 |
| 2007/0294622 A1* | 12/2007 | Sterner et al. | 715/716 |
| 2008/0016338 A1* | 1/2008 | Sun | 713/163 |
| 2008/0031155 A1* | 2/2008 | Korus et al. | 370/254 |
| 2008/0040509 A1* | 2/2008 | Werb et al. | 709/242 |
| 2008/0310407 A1* | 12/2008 | Sewall et al. | 370/381 |
| 2009/0034738 A1* | 2/2009 | Starrett | 380/278 |
| 2009/0146839 A1* | 6/2009 | Reddy et al. | 340/870.02 |
| 2009/0164663 A1* | 6/2009 | Ransom et al. | 709/243 |
| 2010/0115272 A1* | 5/2010 | Batta | 713/162 |

(Continued)

OTHER PUBLICATIONS

International Search Report in corresponding PCT/US09/47077 dated Aug. 19, 2009.

(Continued)

*Primary Examiner* — Azizul Choudhury
*Assistant Examiner* — Tariq Najee-Ullah

(57) ABSTRACT

Mixed mode security is provided for a mesh network comprising a plurality of open mesh points and at least one secure mesh point that is capable of sending and receiving encrypted traffic. Aspects of the exemplary embodiment include configuring the secure mesh point to forward unencrypted traffic received from one of the plurality of open mesh points; and configuring the secure mesh point to be a source of unencrypted source traffic, and to receive unencrypted traffic that is destined for the secure mesh point to enable routes in the mesh network to terminate at the secure mesh point.

18 Claims, 3 Drawing Sheets

(56) References Cited

U.S. PATENT DOCUMENTS

2010/0138926 A1* 6/2010 Kashchenko et al. .......... 726/25
2010/0180113 A1* 7/2010 Graffi et al. ................... 713/153
2010/0285774 A1* 11/2010 Ginzboorg .................... 455/411

OTHER PUBLICATIONS

Written Opinion in corresponding PCT/US09/47077 dated Aug. 19, 2009.

International Preliminary Report on Patentability in corresponding PCT/US09/47077 dated Dec. 14, 2010.

"IEEE P802.11s™ /D2.0-Draft Standard for Information Technology—Telecommunications and information exchange between systems—Local and metropolitan area networks—Specific Requirements—Part 11: Wireless LAN Medium Access Control (MAC) and Physical Layer (PHY) Specifications," *The Institute for Electrical and Electronics Engineers*, 263 pages, 2008.

* cited by examiner

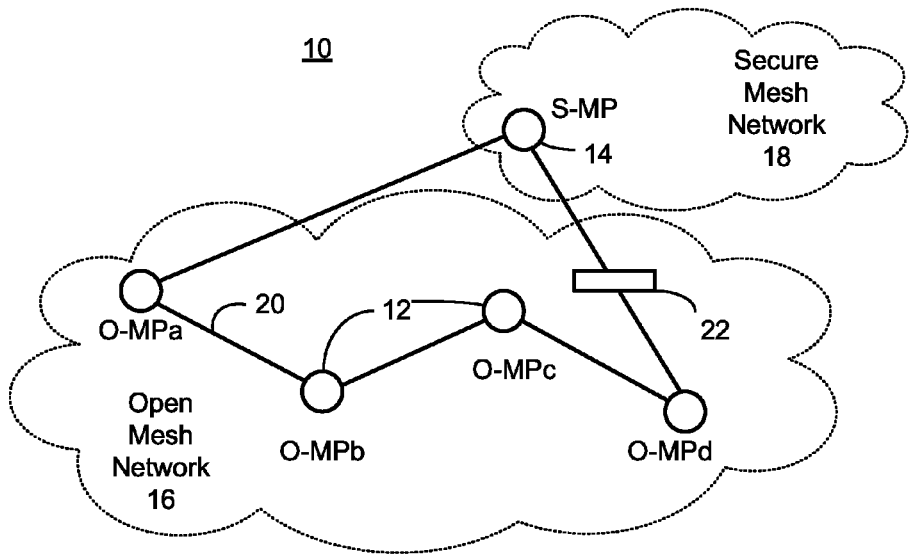

FIG. 1

```
┌─────────────────────────────────────────────┐
│ Configure the secure mesh point (S-MP) to   │
│ forward unencrypted traffic received from one│
│ of the plurality of the open mesh points    │
│ (O-MP's)                                    │
│                   200                        │
└─────────────────────────────────────────────┘
                      │
                      ▼
┌─────────────────────────────────────────────┐
│ Configure the S-MP to be a source of unencrypted │
│ source traffic, and to receive unencrypted traffic│
│ that is destined for the S-MP to enable routes in │
│ the mesh network to terminate at the S-MP         │
│                   202                              │
└─────────────────────────────────────────────┘
```

MIXED MODE SECURITY FOR MESH NETWORKS

CROSS-REFERENCE TO RELATED APPLICATIONS

This application claims the benefit of provisional Patent Application Ser. No. 61/060,583, filed Jun. 11, 2008, assigned to the assignee of the present application and incorporated herein by reference.

BACKGROUND

Institute of Electrical and Electronics Engineers (IEEE) 802.11s is an international wireless LAN (WLAN) standard that describes a mesh network. WLAN devices in a mesh network are referred to as mesh points (MP). The MPs form mesh links with one another, over which mesh paths can be established using a routing protocol. The MPs have relay functions for wirelessly communicating directly with each other, instead of going through centralized control equipment such as a base station.

In a mesh network, data transmitted from one device may arrive at a destination via a sequence of MPs resulting in a multi-hop wireless network configuration. The mesh network of interconnected wireless links between the MPs enables automatic topology learning and dynamic path configuration/reconfiguration around inoperable paths by hopping from MP to MP until the destination is reached.

Communication between different MPs is controlled primarily through a Medium Access Control (MAC) protocol that uses IEEE 802.11 MAC/PHY layers to determine routes through the mesh network. In the MAC routing protocol, each MP learns about neighboring MPs and their current security modes using a neighbor discovery protocol based on received beacons or responses (alternatively, neighboring MPs may be discovered using some other external protocol). The neighbor discovery protocol calls for each MP to advertise its security capability and current security mode in mesh beacon and probe response management frames. Neighbors and neighbor's neighbors information is provided within the beacon management frames. Therefore, each MP can rapidly discover mesh points up to two hops away. Upon discovering the neighboring MPs, each MP records the current security modes of its neighboring MPs in an internal neighborhood routing table.

The MPs in a mesh network support two security modes, open and secure. In an open mesh network, no security mechanism is supported by each of the MPs, which are referred to as open MPs (O-MP). Alternatively, an open MP may refer to an MP that does support a security mode, but runs with security mode turned-off. All data frame exchanges between O-MPs are typically unencrypted.

In contrast, a secure mesh network typically only contains secure MPs (S-MPs) that only communicate with other S-MPs. Each S-MP supports a security mode in which all the frames exchanged between the S-MPs are encrypted. However, a requirement that S-MPs can only communicate with other S-MPs limits the use of S-MPs to an all secure network, such that O-MPs can neither talk to S-MPs nor use S-MPs as forwarders.

In general, mesh networks are often deployed in an ad-hoc manner and in a resource constrained environment. There may be some environments, however, where MPs may need to participate in a secure mesh network in the presence of O-MPs that do not support security.

BRIEF SUMMARY

The exemplary embodiment provides mixed mode security for a mesh network comprising a plurality of open mesh points and at least one secure mesh point that is capable of sending and receiving encrypted traffic. Aspects of the exemplary embodiment include configuring the secure mesh point to forward unencrypted traffic received from one of the plurality of open mesh points; and configuring the secure mesh point to be a source of unencrypted source traffic, and to receive unencrypted traffic that is destined for the secure mesh point to enable routes in the mesh network to terminate at the secure mesh point.

BRIEF DESCRIPTION OF SEVERAL VIEWS OF THE DRAWINGS

FIG. 1 is a block diagram of an exemplary mesh network having mixed mode security in accordance with an exemplary embodiment.

FIG. 2 is a flow diagram illustrating the process for providing a mixed mode security mesh network according to an exemplary embodiment.

DETAILED DESCRIPTION

Figure 3:
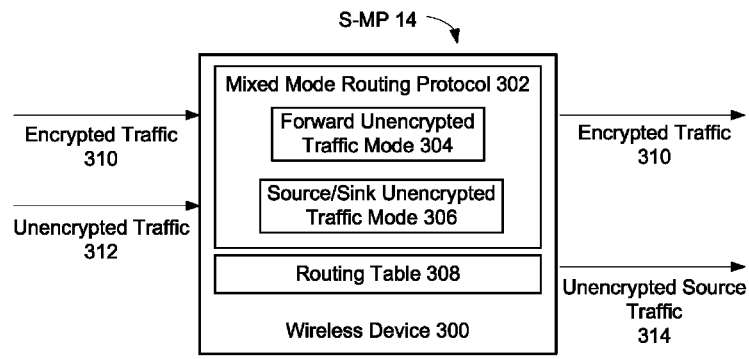
FIG. 3 is a diagram illustrating an exemplary configuration of S-MP having mixed mode routing protocol.

The present invention relates to mixed mode security for mesh networks. The following description is presented to enable one of ordinary skill in the art to make and use the invention and is provided in the context of a patent application and its requirements. Various modifications to the preferred embodiments and the generic principles and features described herein will be readily apparent. Thus, the present invention is not intended to be limited to the embodiments shown, but is to be accorded the widest scope consistent with the principles and features described herein.

The exemplary embodiments are mainly described in terms of particular systems provided in particular implementations. Although the exemplary embodiment may be implemented as an architecture and protocol for providing an Electrical and Electronics Engineers (IEEE) 802.11 Extended Service Set (ESS) Mesh using the IEEE 802.11 MAC/PHY layers to create an IEEE 802.11 Wireless Distribution System that supports both broadcast/multicast and unicast delivery at the MAC layer over self-configuring multi-hop topologies, this method and system will operate effectively in other implementations. For example, the systems, devices, and networks usable with the present invention can take a number of different forms. The exemplary embodiments will also be described in the context of particular methods having certain steps. However, the method and system operate effectively for other methods having different and/or additional steps and steps in different orders not inconsistent with the exemplary embodiments.

The exemplary embodiment provides a method system for mixed mode security for mesh networks that allows an open mesh point (O-MP) to communicate with a secure mesh point (S-MP). When the mixed mode security option is enabled, the S-MP can forward unencrypted traffic intended for an O-MP, and allow routes to/from the O-MP to be set up through the S-MP. The mixed mode security option of the exemplary embodiment provides a way to extend coverage of a mesh network of O-MPs without compromising the security of S-MPs.

FIG. 1 is a block diagram of an exemplary mesh network having mixed mode security in accordance with an exemplary embodiment. The mesh network 10 comprises multiple mesh points (MPs) equipped with WLAN mesh network functions. The MPs may comprise individual wireless devices using mesh services to communicate with other wireless devices in the network. The MPs may also comprise access points equipped with both MP functions and access point functions for providing access to the mesh network to mobile clients, and/or a mesh portal equipped with both MP functions and a gateway function for providing access to an external network.

The mesh network 10 may include a plurality of open MP's 12, designated as O-MPa through O-MPd; and at least one secure MP 14, designated as S-MP. As used herein, an O-MP 12 is a MP that does not support a security mode or a MP that is running with security mode turned off. An S-MP 14 is an MP that does support a security mode and is running with the security mode enabled. In one embodiment, the O-MPs 12 may originally belong to an open mesh network 16, while the S-MP 14 may originally belong to a secure mesh network 18.

Using the WLAN mesh network functions, the MPs form mesh links with one another, over which mesh paths 20 can be established. In one embodiment, communication and mesh paths may be established between the MPs using a routing protocol. According to the routing protocol, communication between different MPs is either traffic between the MPs for internal management, which is called MP traffic, or traffic transmitted as a result of communication between an MP and a mobile station, which is called AP traffic. In one embodiment, the routing protocol may be based on the Medium Access Control (MAC) layer. Example MAC layer routing protocols include Ad-Hoc On-Demand Distance Vector (AODV) and Optimized Link State Routing Protocol (OLSR). Alternatively, a proprietary routing protocol may be used.

During MP traffic, each MP learns about neighboring MPs and their current security modes using a neighbor discovery protocol based on received beacons or responses (alternatively, neighboring MPs may be discovered using some other external protocol). For example, MPs may discover routes by issuing proxy request or route request (PREQ/RREQ) messages, hereinafter referred to as P/PREQ messages, through a portion of the mesh network 10, and by issuing proxy reply or route reply (PREP/RREP) messages, hereinafter referred to as P/PREP messages, to announce a path to a destination. The neighbor discovery protocol calls for each MP to advertise its security capability and current security mode in mesh beacon and probe response management frames 22, which comprise a series of packets. Neighbors and neighbor's neighbors information is provided within the beacon management frames. Therefore, each MP can rapidly discover mesh points up to two hops away.

Through the routing protocol, one MP can discover other MPs and determine a path 20 to reach the destination through intermediate MPs. The intermediate MPs are required to forward traffic to the final destination. The intermediate MPs are also expected to participate in mesh discovery.

For example, when source O-MPa wants to send data to O-MPd, O-MPa performs route discovery using management frames 22. At the end of route discovery, O-MPa obtains a path 20 to reach O-MPd through, for example, O-MPb and O-MPc, which are intermediate MPs that also participate in route discovery. During the AP traffic period, data packets are routed from O-MPa to O-MPd through O-MPb and O-MPc. Periodically during MP traffic, O-MPa might also initiate route discovery to O-MPd to determine if other routes exist.

Each MP maintains a list of neighboring nodes and routes to other MPs in a route table. When a source MP wants to send a traffic frame to some destination MP, the source MP checks its routing table for a route. If there is a valid route, the source MP forwards the traffic frame to the next hop specified in the routing table for this destination MP. When a MP cannot find a destination MP in its routing table, the MP broadcasts a route request (P/RREQ) message in a beacon frame. When a neighbor MP receives a P/RREQ message, a uni-cast route response (P/RREP) reply will be returned to the source MP if the neighbor MP has an entry for the route in its routing table. Otherwise, the neighbor MP forwards the P/RREQ message.

In one embodiment where the 802.11s standard is followed, the P/RREQ message may contain an originator IEEE 802.11 MAC address with its sequence number and its optional layer 3 information (supported layer 3 protocol and address, e.g. the IP address of destination MP), a destination MP MAC address with a last known destination sequence number and optional layer 3 information for this destination. The P/RREQ message may also contain a message ID, a hop count, a routing metric, flags, a time-to-live, and/or a route lifetime.

The mesh networks generally support two security modes, open and secure. In the open mesh network 16, for example, the O-MPs 12 is an MP that either does not support a security mode or one that supports a security mode but is running with the security mode turned-off. All data frame exchanges to/from the O-MPs 12 are therefore unencrypted. In contrast, the S-MP 14 runs with security mode activated. In conventional mesh networks, this means that an S-MP only communicates with other S-MPs and that all the frames exchanged between the S-MPs are encrypted. However, a requirement that S-MPs can only communicate with other S-MPs limits the use of S-MPs to an all secure mesh network, such that O-MPs can neither talk to S-MPs nor use S-MPs as forwarders.

According to the exemplary embodiment, the mesh network 10 having mixed mode security is provided in which the S-MP 14 may participate in the mesh network 10 in the presence of O-MP's 12 and communication occurs between the O-MPs 12 and the S-MP 14, as described below.

FIG. 2 is a flow diagram illustrating the process for providing a mixed mode security mesh network according to an exemplary embodiment. The processes includes configuring the secure mesh point (S-MP) 14 to forward unencrypted traffic received from one of the plurality of the open mesh points (O-MPs) 12 (block 200). The process also includes configuring the S-MP 14 to be a source of unencrypted source traffic, and to receive unencrypted traffic that is destined for the S-MP 14 to enable routes in the mesh network to terminate at the S-MP 14 (block 202). In one embodiment, the configuration of the S-MP 14 may be implemented by providing a mixed mode routing protocol having configurable mode options.

FIG. 3 is a diagram illustrating an exemplary configuration of S-MP 14 having mixed mode routing protocol. According to one exemplary embodiment, the S-MP 14 comprises a wireless device 300 that includes mixed mode routing protocol 302 executed by a processor (not shown), and a routing table 308. The O-MPs 12 may also include the mixed mode routing protocol 302, but the mixed mode routing protocol 302 may be turned off. The mixed mode routing protocol 302 may include two configurable security modes, a Forward Unencrypted Traffic Mode 304 and a Source/Sink Unencrypted Traffic Mode 306. The S-MP 14 is still able to receive and send encrypted traffic 310 from other S-MPs, however, when the Forward Unencrypted Traffic Mode 304 is enabled, the S-MP 14 also is able to receive and forward unencrypted traffic 310 destined for other O-MPs 12. And when the Source/Sink Unencrypted Traffic Mode 306 is enabled, the S-MP 14 is able to originate unencrypted source traffic 314 and to receive unencrypted traffic 312 that is destined for the S-MP 14 (and other S-MPs running the mixed mode routing protocol 302).

When the Forward Unencrypted Traffic Mode 304 is enabled, if the S-MP 14 receives an unencrypted frame (unicast or broadcast) that is not destined to itself, the S-MP 14 forwards the unencrypted frame without encryption as well (regardless of the security mode of the next destination). The S-MP also will allow routes to/from O-MPs to be setup through itself. One advantage of the Forward Unencrypted Traffic Mode 304 may be that the mode allows an effective way to extend the coverage of a mesh network for O-MPs without compromising the security of S-MPs. For example, in FIG. 1, the O-MPs in open mesh network 16 may gain access to the secure mesh network 18 through the S-MP 14.

The Source/Sink Unencrypted Traffic Mode 306 once enabled allows the S-MP 14 to be a source or sink of encrypted traffic 310, a sink for unencrypted traffic 312 destined for the S-MP 14, and a source for unencrypted source traffic 314. If the S-MP 14 receives a frame (unicast or broadcast) containing packets that is destined to the S-MP 14, the S-MP 14 may send the frame up an Open Systems Interconnection (OSI) layer stack. (The seven OSI layers are: a physical layer, a data link layer, a network layer, a transport layer, a session layer, a presentation layer, and an application layer), e.g., IEEE 802.11 medium access control service access point (MAC_SAP). When sending the frame up the stack, the S-MP 14 indicates whether the S-MP 14 received the corresponding frame encrypted or unencrypted so that an end application or service can determine how to handle the frame. For this purpose, each frame forwarded up the stack may include a flag indicating whether the frame was received encrypted or unencrypted. Similarly, the S-MP 14 receives each packet sent down the stack by an end application or service with the flag set to indicate whether the S-MP 14 should encrypt the packet or not when transmitting the packet in a frame 22 containing this packet. The applications and services that have access to the S-MP 14 may be configured to perform these functions.

One advantage of the Source/Sink Unencrypted Traffic Mode 306 is that the mode allows the S-MP 14 to communicate to end-points that are O-MPs 12. However, the S-MP 14 should define which applications and services can be accessed by the unencrypted source traffic 314 to ensure that its security is not compromised.

In one embodiment, the MPs 12 and 14 can be configured in one of the above security modes at a time of mesh start, such that a "mesh_start" command from a device driver triggers the security capability of the MPs 12 and 14. The security capability of the MPs 12 and 14 may then be advertised in respective mesh beacon and probe response management frames 22. In one embodiment, the two configurable mode options for the S-MP 14, the Forward Unencrypted Traffic Mode 304 and the Source/Sink Unencrypted Traffic Mode 306, are not advertised and are configured based on local node policy.

As stated above, typical route discovery uses management action frames which are not encrypted by the firmware. However, as shown in FIG. 1, there may be a situation when there is a mix of S-MPs 14 and O-MPs 12. In such a case, route discovery started by one S-MP 14 for another S-MP should not pass through one of the O-MPs 12. However, a route discovery started by the S-MP 14 for a particular O-MP 12 can pass through another O-MP when the O-MP 12 is the final destination.

According to the exemplary embodiment, the mixed mode routing protocol 302 provides a mixed mode route discovery process to handle such situations. The mixed mode route discovery process may use at least one reserved bit in each management frame 22 to indicate whether the route discovery is secure or open. This reserved bit may be referred to as the SR bit. In one embodiment, a reserved bit in a flag field (octet 2) of the P/RREQ message as defined by the 802.11s standard may be used. More specifically, bit 7 of the flag field of the P/RREQ message may be used as the SR bit. In one embodiment, a value of 1 in the SR bit may be used to indicate secure route discovery, while a 0 may be used to indicate open route discovery. Of course, other bit values may be used.

Figure 4A:
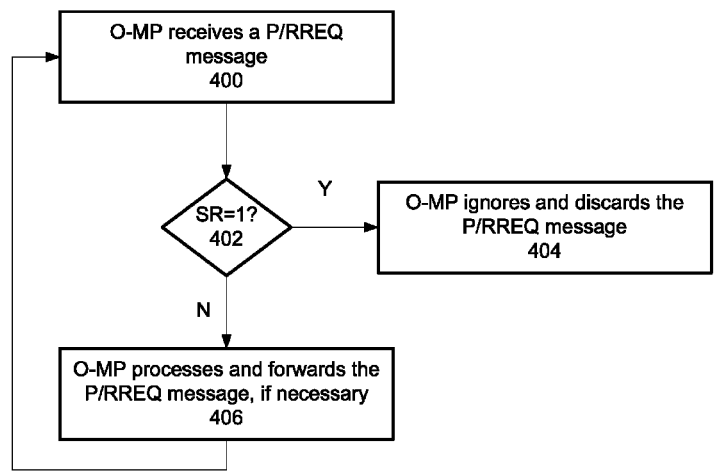
FIGS. 4A and 4B are flow diagrams illustrating processes for implementing mixed mode route discovery in response to receiving a route request in accordance with an exemplary embodiment.
Figure 4B:
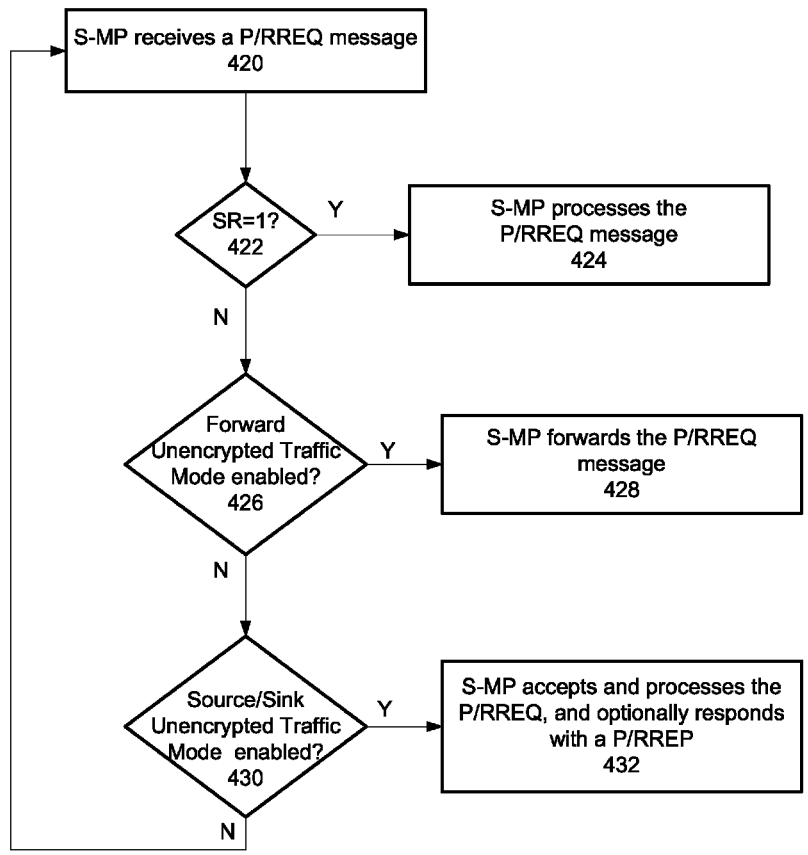

FIGS. 4A and 4B are flow diagrams illustrating processes for implementing mixed mode route discovery in response to an MP receiving a route request in accordance with an exemplary embodiment. FIG. 4A depicts mixed mode route discovery process performed by an O-MP 12, while FIG. 4B depicts mixed mode route discovery process performed by an S-MP 14.

Referring to FIG. 4A, in response to the O-MP 12 receiving a P/RREQ message (block 400), the O-MP 12 determines whether the SR bit in the P/RREQ message indicates secure route discovery, e.g., SR=1, or open route discovery e.g., SR=0 (block 402). If the SR bit indicates secure route discovery, then the O-MP 12 ignores and discards the P/RREQ message (block 404). If the SR bit does not indicate secure route discovery, then open route discovery is indicated and the O-MP 12 processes and forwards the P/RREQ message, if necessary (block 406).

Referring to FIG. 4B, in response to the S-MP 14 receiving a P/RREQ message (block 420), the S-MP 14 determines whether the SR bit in the P/RREQ message indicates secure route discovery, e.g., SR=1, or open route discovery e.g., SR=0 (block 422). If the SR bit indicates secure route discovery, then the S-MP 14 processes the P/RREQ message (block 424). If the SR bit does not indicate secure route discovery, then open route discovery is indicated, and the S-MP 14 determines if the Forward Unencrypted Traffic Mode 304 is enabled (block 426). If the Forward Unencrypted Traffic Mode 304 is enabled, then the S-MP 14 may forward the P/RREQ message (block 428). If the Forward Unencrypted Traffic Mode 304 is not enabled, the S-MP 14 determines if the Source/Sink Unencrypted Traffic Mode 306 is enabled (block 430). If the Source/Sink Unencrypted Traffic Mode 306 is enabled, the S-MP 14 may accept and process the P/RREQ message, and optionally respond with a route reply (P/RREP) message (block 432).

The foregoing described the mixed mode route discovery in response to an MP receiving a route request. The following is a description of the mixed mode route discovery process originated by an MP.

In the mixed mode mesh network 10 comprising a mix of O-MPs 12 and S-MPs 14, there are four possibilities of route discovery origination: route discovery originated by an O-MP 12 for another O-MP, route discovery originated by an O-MP 12 for the S-MP 14, route discovery originated by the S-MP 14 for another S-MP, and route discovery originated by a S-MP 14 for an O-MP 12.

When route discovery is originated by an O-MP 12 for another O-MP, the O-MP 12 generates a P/RREQ message and sets the SR bit to 0. The P/RREQ message will then be forwarded by all intermediate O-MPs and S-MPs that are configured to forward unencrypted traffic.

When route discovery is originated by an O-MP 12 for the S-MP 14, the O-MP 12 generates a P/RREQ message and sets the SR bit to 0. This scenario also works if the S-MP 14 has enabled Source/Sink Unencrypted Traffic mode. Assuming this is the case, the P/RREQ message will then be forwarded by all intermediate O-MPs and S-MPs which are configured to forward unencrypted traffic 312 destined for the S-MP 14, until the P/RREQ message is accepted and responded to by the S-MP 14 if the S-MP 14 has the Source/Sink Unencrypted Traffic mode enabled.

When route discovery is originated by a S-MP 14 for another S-MP, the S-MP 14 originating the route discovery generates a P/RREQ message having the SR bit set to 1. Intermediate S-MPs may only send a secure P/RREP message in response to the P/RREQ message having the SR bit set to 1 from their routing table 308, if any secure route exists. Intermediate O-MPs shall ignore and discard any P/RREQ message having the SR bit set to 1. This guarantees that all P/RREPs for communication between two S-MPs contain only secure nodes.

When route discovery is originated by the S-MP 14 for one of the O-MPs, the S-MP 14 generates a P/RREQ message having the SR bit set to 0. This scenario also works if the S-MP 14 has enabled the Source/Sink Unencrypted Traffic mode. Assuming this is the case, the P/RREQ message will then be forwarded by all intermediate O-MPs and S-MPs which are configured to forward the unencrypted source traffic 314.

The following is a description of the mixed mode route discovery process for discovering the security mode of a final destination.

When the S-MP 14 starts the mixed mode route discovery process for a given destination, the S-MP 14 may be unaware of the security mode and configuration of the final destination. If this is the case, the S-MP 14 initiates the route discovery with a P/RREQ message having its SR bit set to 1. If the route discovery fails and the S-MP 14 has the Source/Sink Unencrypted Traffic mode enabled, the S-MP 14 may initiate another route discovery after a timeout using a P/RREQ message having its SR bit set to 0.

A further embodiment of the mixed mode route discovery process may aid in a quicker discovery of the security mode of the final destination in a particular circumstance. This circumstance is when the final destination is an O-MP and the S-MP 14 starts the route discovery with a P/RREQ message having the SR bit set to 1, and the P/RREQ message reaches the O-MP through all S-MP nodes. In this embodiment, the O-MP can reply by sending a P/RREP (proxy or route reply) message as the route is discovered and notify the source S-MP 14 (P/RREQ originator) by setting a flag in the P/RREP message (e.g., bit 7 of flag field, octet 2, of the P/RREP message). This flag in the P/RREP message may be inspected by the source S-MP 14, which can then initiate a route discovery with a P/RREQ message with the SR bit set to 0.

In one embodiment, the mixed mode routing protocol may be made responsive to memory requirements of the MP. For example, the mixed mode routing protocol may have aging neighbor entries in the routing table 308 deleted to make room for new neighbors when the MP has limited memory to store neighbor contexts.

In another embodiment, the mixed mode routing protocol may be configured to maintain security capability information. For example, the S-MP 14 may be configured to learn a security mode of MPs that are not 1-hop neighbors by listening to frames originated by MPs during forwarding. To illustrate, consider the following example showing traffic forwarded through a mesh network, which includes an O-MP 12 and several S-MPs:

O-MP1 ↔ S-MP2 ↔ S-MP3 ↔ S-MP4←

In the example, the S-MPs 3-4 that are not 1-hop neighbors of the O-MP1 may learn the security mode of the O-MP1 by listening to traffic originated by the O-MP1. This may be accomplished by the S-MPs 2-4 marking the O-MP1 using some data structure, hereinafter called a MP_SECURITY_POLICY_TABLE, while forwarding traffic from O-MP1 or while passing P/RREQ messages with SR bit set to 0, that were originated from O-MP1. Similarly, while forwarding secure data traffic or management routing traffic from an S-MP source that has the SR bit set to 1, the S-MPs 2-4 can mark the S-MP source in its MP_SECURITY_POLICY_TABLE.

When the S-MPs 2-4 subsequently require a route to O-MP1, the S-MPs 2-4 can use previously learned information to decide whether the SR bit should be 0/1. In particular, the S-MPs 2-4 may perform a lookup in MP_SECURITY_POLICY_TABLE to determine whether the destination is secure or open and accordingly whether the SR bit should be set to 1 or 0, respectively. If there is no entry in MP_SECURITY_POLICY_TABLE for a given destination, the S-MP should start route discovery using the process described above for discovering the security mode of a final destination.

A method and system for providing mixed mode security for a mesh network has been disclosed. The present invention has been described in accordance with the embodiments shown, and there could be variations to the embodiments, and any variations would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Accordingly, many modifications may be made by one of ordinary skill in the art without departing from the spirit and scope of the appended claims.

We claim:

1. A method for providing mixed mode security for a mesh network comprising (i) a plurality of open mesh points that are configured to send and receive unencrypted traffic, and (ii) a plurality of secure mesh points that are configured to send and receive encrypted traffic, the method comprising:

configuring a first secure mesh point in the plurality of secure mesh points to operate in a mixed mode in which the first secure mesh point is configured to (i) exchange encrypted traffic with other secure mesh points and (ii) exchange unencrypted traffic with open mesh points; and while the first secure mesh point is operating in the mixed mode:

receiving, at the first secure mesh point, traffic from either one of the open mesh points or a second secure mesh point with which the first secure mesh point has already exchanged encrypted traffic, if the traffic is unencrypted traffic, one of (i) forwarding, with the first secure mesh point, the unencrypted traffic to an open mesh point in the plurality of open mesh points, or (ii) if the unencrypted traffic is destined for the first secure mesh point, accepting and processing the unencrypted traffic at the first secure mesh point, and if the traffic is encrypted traffic, processing the encrypted traffic.

2. The method of claim 1, further comprising providing the first secure mesh point, when configured to operate in said mixed mode, with configurable first and second security modes, wherein:

when the first security mode is enabled, the first secure mesh point forwards received unencrypted traffic that is destined for open mesh points, and when the second security mode is enabled, the first secure mesh point originates unencrypted source traffic, and accepts and receives unencrypted traffic that is destined for the first secure mesh point.

3. The method of claim 2, wherein when the first security mode is enabled, the first secure mesh point is configured to set up routes between the first secure mesh point and the plurality of open mesh points.

4. The method of claim 2, wherein the encrypted traffic and the unencrypted traffic are transmitted through the mesh network, the method further comprising:

using at least one reserved bit in a management frame to indicate secure route discovery or open route discovery.

5. The method of claim 2, wherein when route discovery is originated by a first open mesh point for a second open mesh point:

the first open mesh point generates a route request message indicating open route discovery;

the route request message is forwarded by intermediate open mesh points; and the first secure mesh point is configured to forward the route request message while the first secure mesh point is operating in the mixed mode.

6. The method of claim 2, wherein when route discovery is originated by a first open mesh point for the first secure mesh point, the first open mesh point generates a route request message indicating open route discovery, and the route request message is forwarded by intermediate open mesh points and any other secure mesh points that are configured to operate in the mixed mode to forward the unencrypted traffic destined for the first secure mesh point, and the route request message is accepted and responded to by the first secure mesh point, while the first secure mesh point is operating in the mixed mode and if the first secure mesh point has the second security mode enabled.

7. The method of claim 2, wherein when route discovery is originated by the first secure mesh point for a third secure mesh point, the first secure mesh point originating the route discovery generates a route request message indicating secure route discovery such that intermediate secure mesh points only send a secure route response message if any secure route exists, and wherein intermediate open mesh points ignore and discard the route request message.

8. The method of claim 2, wherein when the first secure mesh point has the second security mode enabled and route discovery is originated by the first secure mesh point for one of the open mesh points, the first secure mesh point, generates a route request message indicating open route discovery, and the route request message is forwarded by intermediate open mesh points and any secure mesh points which are configured to forward the unencrypted source traffic.

9. The method of claim 2, wherein, while the first secure mesh point is operating in the mixed mode:

when the first secure mesh point starts a first route discovery for a final destination, but is unaware of a security mode of the final destination, the first secure mesh point generates a first route request message indicating secure route discovery, and if the first route discovery fails and the first secure mesh point has the second security mode enabled, the first secure mesh point initiates a second route discovery using a second route request message indicating open route discovery.

10. The method of claim 1, wherein the first secure mesh point is configured to maintain security capability information of the open mesh points that are not 1-hop neighbors by listening to traffic originated by open mesh points during forwarding.

11. A wireless device for use in a mesh network, the mesh network including (i) a plurality of open mesh points that are configured to send and receive unencrypted traffic, and (ii) a plurality of secure mesh points that are configured to send and receive encrypted traffic, the wireless device comprising:

a processor configured to configure the wireless device to operate in a mixed mode in which the wireless device is configured to (i) exchange encrypted traffic with secure mesh points and (ii) exchange unencrypted traffic with open mesh points; and while the wireless device is operating in the mixed mode:

determine whether traffic received at the wireless device from either 9*i*) one of the open mesh points or (ii) a secure mesh point with which the wireless device has already exchanged encrypted traffic is unencrypted traffic or encrypted traffic, if the traffic is unencrypted traffic, one of (i) cause the wireless device to forward the unencrypted traffic to an open mesh point in the plurality of open mesh points, or (ii) if the unencrypted traffic is destined for the wireless device, cause the wireless device to accept and process the unencrypted traffic, and if the traffic is encrypted traffic, cause the wireless device to process the encrypted traffic.

12. The wireless device of claim 11, wherein the processor, when the wireless device is operating in the mixed mode, is configured to operate (i) in a first security mode, when enabled, and (ii) in a second security mode, when enabled, wherein:

when the first security mode is enabled, the wireless device forwards the unencrypted traffic, and when the second security mode is enabled, the wireless device originates unencrypted source traffic and receives unencrypted traffic that is destined for the wireless device.

13. The wireless device of claim 12, wherein when the wireless device is operating in the mixed mode and when the first security mode is enabled, the wireless device is configured to set up routes between the wireless device and the plurality of open mesh points.

14. The wireless device of claim 12, wherein when route discovery is originated by a first open mesh point for a second open mesh point, the first open mesh point generates a route request message indicating open route discovery, and the route request message is forwarded by intermediate open mesh points and the wireless device while the wireless device is operating in the mixed mode.

15. The wireless device of claim 12, wherein when route discovery is originated by a first open mesh point for the wireless device, the first open mesh point generates a route request message indicating open route discovery, and the route request message is forwarded by intermediate open mesh points and any other secure mesh points that are configured in the mixed mode to forward the unencrypted traffic destined for the wireless device, and the route request message is accepted and responded to by the wireless device while the wireless device is operating in the mixed mode and if the wireless device has the second security mode enabled.

16. The wireless device of claim 12, wherein when route discovery is originated by a first secure mesh point for a second secure mesh point, the first secure mesh point originating the route discovery generates a route request message indicating secure route discovery, such that intermediate secure mesh points only send a secure route response message if any secure route exists, and wherein intermediate open mesh points ignore and discard the route request message.

17. The wireless device of claim 12, wherein when route discovery is originated by the wireless device, while the wireless device is operating in the mixed mode, for one of the open mesh points, the wireless device generates a route request message indicating open route discovery, and the route request message is forwarded by intermediate open mesh points and any secure mesh points which are configured in the mixed mode to forward the unencrypted source traffic.

18. The wireless device of claim 12, wherein, while the wireless device is operating in the mixed mode and when the wireless device starts a first route discovery for a final destination, but is unaware of a security mode of the final destination, the wireless device generates a first route request message indicating secure route discovery, wherein if the first route discovery fails and the wireless device has the second security mode enabled, the wireless device initiates a second route discovery using a second route request message indicating open route discovery.

* * * * *